United States Patent
Rhodes et al.

(10) Patent No.: US 9,770,972 B1
(45) Date of Patent: Sep. 26, 2017

(54) PUSH-PULL HEAT MANAGEMENT SYSTEM FOR A MOTOR VEHICLE

(71) Applicant: FORD GLOBAL TECHNOLOGIES, LLC, Dearborn, MI (US)

(72) Inventors: Kevin James Rhodes, Dearborn, MI (US); Louis Paspal, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 15/346,019

(22) Filed: Nov. 8, 2016

(51) Int. Cl.
*B60K 11/06* (2006.01)
*B60K 11/08* (2006.01)
*F01P 5/06* (2006.01)

(52) U.S. Cl.
CPC ............ *B60K 11/06* (2013.01); *B60K 11/085* (2013.01); *F01P 5/06* (2013.01); *B60Y 2306/05* (2013.01)

(58) Field of Classification Search
CPC ....... B60K 11/06; B60K 11/08; B60K 11/085; B60K 16/00; F01P 5/02; F01P 5/06; B60Y 2306/05
USPC .................................. 180/68.1, 68.2, 2.1, 2.2
See application file for complete search history.

(56) References Cited

U.S. PATENT DOCUMENTS

| | | | |
|---|---|---|---|
| 3,168,348 A * | 2/1965 | Fleming | B60B 7/0086 301/13.1 |
| 5,947,219 A | 9/1999 | Peter et al. | |
| 6,138,781 A * | 10/2000 | Hakala | B60K 16/00 180/165 |
| 8,098,040 B1 | 1/2012 | Botto | |
| 8,646,550 B2 | 2/2014 | Penev | |
| 9,228,563 B2 * | 1/2016 | Thomazios | F03D 1/025 |
| 2011/0266075 A1 * | 11/2011 | Guzelimian | B60K 16/00 180/2.2 |
| 2012/0018231 A1 | 1/2012 | Bakraoui | |
| 2016/0272257 A1 * | 9/2016 | McKillen | B62D 35/005 |
| 2017/0082092 A1 * | 3/2017 | Gaither | F03D 9/32 |

FOREIGN PATENT DOCUMENTS

| | | |
|---|---|---|
| DE | 4342138 A1 | 6/1995 |
| DE | 102012024189 A1 | 6/2014 |
| EP | 1747910 A2 | 1/2007 |

OTHER PUBLICATIONS

English Machine Translation of DE4342138A1.
English Machine Translation of DE102012024189A1.

* cited by examiner

*Primary Examiner* — John Walters
(74) *Attorney, Agent, or Firm* — Jason Rogers; King & Schickli, PLLC (57) ABSTRACT

A heat management system is provided for a motor vehicle. That heat management system includes a first wheel rim having an air inlet, a thermal load downstream from the air inlet and a second wheel rim having an air outlet downstream from the thermal load. A method of managing heat in a motor vehicle is also disclosed.

20 Claims, 6 Drawing Sheets

PUSH-PULL HEAT MANAGEMENT SYSTEM FOR A MOTOR VEHICLE

TECHNICAL FIELD

This document relates generally to the motor vehicle equipment field and, more particularly, to a new and improved heat management system that both pushes and pulls a stream of air to cool a thermal load in an efficient and effective manner.

BACKGROUND

Heat management is one of the primary challenges in modern motor vehicles. In the past, heat management has generally involved positioning a radiator at the front of the motor vehicle where air may pass through fins for heat exchange. While such a radiator does work well to reduce heat, the positioning of a radiator, having sufficient frontal area to provide proper cooling, significantly reduces vehicle aerodynamics. Further, a radiator cooling system adds considerable weight and complexity to a motor vehicle. As corporate average fuel economy (CAFÉ) standards continue to demand better fuel economy, it is important to minimize both the size and weight of the thermal system.

This document relates to a new and improved push-pull heat management system that provides effective cooling of a thermal load and reduces or even eliminates dependence upon a radiator system. Accordingly, this reduces vehicle weight and frees designers to improve aerodynamics and ultimately, the energy efficiency and fuel economy of the motor vehicle.

SUMMARY

In accordance with the purposes and benefits described herein, a heat management system is provided for a motor vehicle. That heat management system includes a first wheel rim including an air inlet, a thermal load downstream from the air inlet and a second wheel rim including an air outlet downstream from the thermal load.

The heat management system may further include a first turbine blade feature at the air inlet to push or force air toward the thermal load. Further, the heat management system may also include a second turbine blade feature at the air outlet to draw or pull that air from the thermal load. By pushing and pulling the air, a greater volume of cooling air is provided for heat exchange with the thermal load in a shorter period of time.

The heat management system may also include a first conduit directing the air from the air inlet to the thermal load. Further, the heat management system may also include a second conduit directing the air from the thermal load to the air outlet.

The first turbine blade feature may include a first plurality of variable pitch turbine blades. Similarly, the second turbine blade feature may include a second plurality of variable pitch turbine blades. Each turbine blade of the first plurality of variable pitch turbine blades and the second plurality of variable pitch turbine blades may include a slide shaft, a mass block displaceable along the slide shaft and a centripetal force opposition spring.

Further, each turbine blade may include an axis bar having a spiral thread. In addition the mass block may include a thread key that rides in the spiral thread and rotates the turbine blade depending upon a position of the thread key in the spiral thread as determined by displacement of the mass block along the slide shaft. The slide shaft and the axis bar may both extend radially on the first wheel rim or the second wheel rim.

In accordance with an additional aspect, a method is provided of managing heat in a motor vehicle. That method comprises the steps of: (a) directing air through an air inlet in a first wheel rim, (b) passing that air through or in heat exchange relationship with a thermal load downstream from the air inlet and (c) directing that air through an air outlet in a second wheel rim downstream from the thermal load.

The method may further include the step of drawing the air through the air inlet by use of a first turbine blade feature on the first wheel rim. Further, the method may include the step of expelling the air through the air outlet by use of a second turbine blade feature on the second wheel rim.

In addition, the method may include the step of varying the pitch of the first turbine blade feature to control the flow of the air through the air inlet. Similarly, the method may include the step of varying the pitch of the second turbine blade feature to control the flow of the air through the air outlet.

In some of the many possible embodiments, the method may include the step of varying the pitch of the first turbine blade feature by a controller configured to increase the flow of the air through the air inlet in response to increased cooling requirements. Further, the method may include the step of varying the pitch of the first turbine blade feature by the controller configured to decrease flow of the air though the air inlet in response to decreased cooling requirements. Similarly, the method may include the step of varying the pitch of the second turbine blade feature by the controller configured to increase flow of the air through the air outlet in response to increased cooling requirements. Further, the method may include the step of varying the pitch of the second turbine blade feature by the controller configured to decrease the flow of the air through the air outlet in response to decreased cooling requirements.

In the following description, there are shown and described several preferred embodiments of the heat management system as well as the related method of managing heat in a motor vehicle. As it should be realized, the heat management system and the related method are capable of other, different embodiments and their several details are capable of modification in various, obvious aspects all without departing from the heat management system and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the heat management system and the related method and together with the description serve to explain certain principles thereof. In the drawing figures.

DETAILED DESCRIPTION

Figure 1:
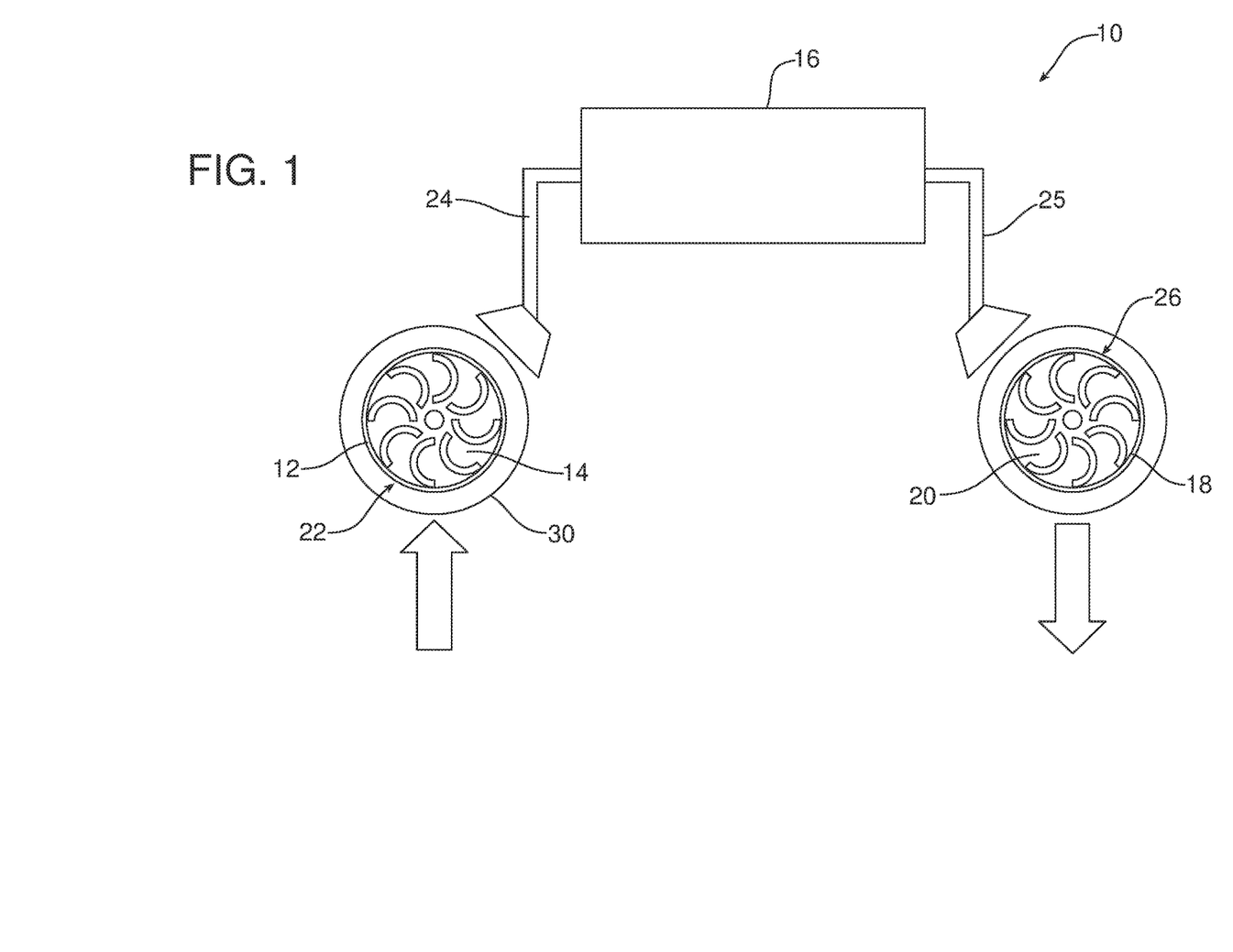
FIG. 1 is a schematic block diagram illustrating the new and improved heat management system.

Reference is now made to FIG. 1 which schematically illustrates the new and improved heat management system 10. The heat management system 10 includes a first wheel rim 12 including a first air inlet 14. The heat management system 10 also includes a thermal load 16, downstream from the air inlet 14. A second wheel rim 18 includes an air outlet 20 downstream from the thermal load 16.

The thermal load 16 may comprise a heat exchanger, a high voltage battery such as a traction motor battery, a fuel cell or substantially any other device on a motor vehicle that requires cooling.

A first turbine blade feature 22 is provided on the first wheel rim 12 at the air inlet 14. The first turbine blade feature 22 functions to force or push air toward the thermal load 16 through the first conduit 24 extending between the air inlet 14 and the thermal load.

A second turbine blade feature 26 is provided on the second wheel rim 18 at the air outlet 20. The second turbine blade feature 26 functions to draw or pull air from the thermal load 16 through a second conduit 25 to the air outlet 20 through which the air is discharged back into the environment. Thus, it should be appreciated that the first turbine blade feature 22 and second turbine blade feature 26 on the respective first wheel rim 12 and the second wheel rim 18 produce a push-pull air flow system that moves a high volume of air through heat exchange relationship with the thermal load 16 in a relatively short period of time thereby maximizing cooling efficiency. As that air is drawn through the air inlet 14 at the first wheel rim 12 frontal area cooling requirements are substantially reduced and the motor vehicle equipped with the heat management system 10 may incorporate a more aerodynamic and fuel efficient shape.

Figure 2A:
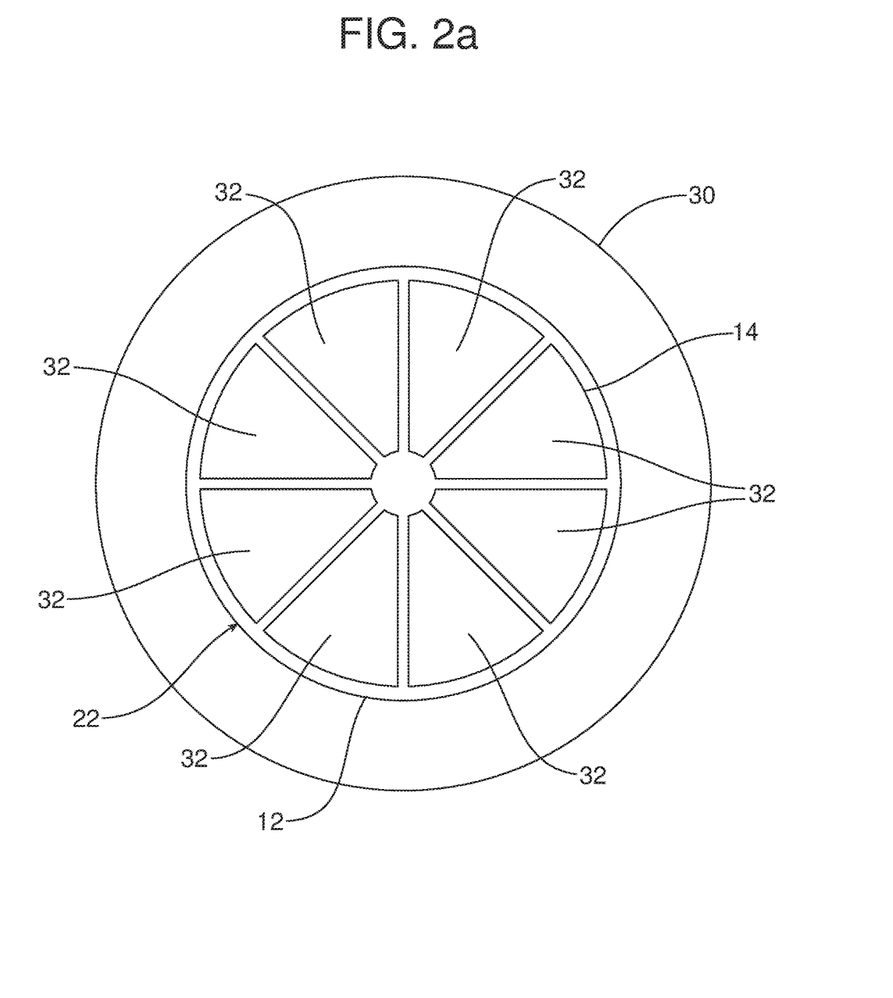
FIG. 2a is a schematic illustration of a first wheel rim of a motor vehicle equipped with the heat management system set forth in FIG. 1.

Reference is now made to FIG. 2a illustrating the first wheel rim 12 in detail. As illustrated, a tire 30 is held on the first wheel rim 12. As illustrated in full line in FIG. 2a, the first turbine blade feature 22 comprises the first plurality of variable pitch turbine blades 32. In the illustrated embodiment, eight variable pitch turbine blades 32 are shown. Those variable pitch turbine blades 32 are illustrated in full line in a closed position closing off the air inlet 14.

Figure 2B:
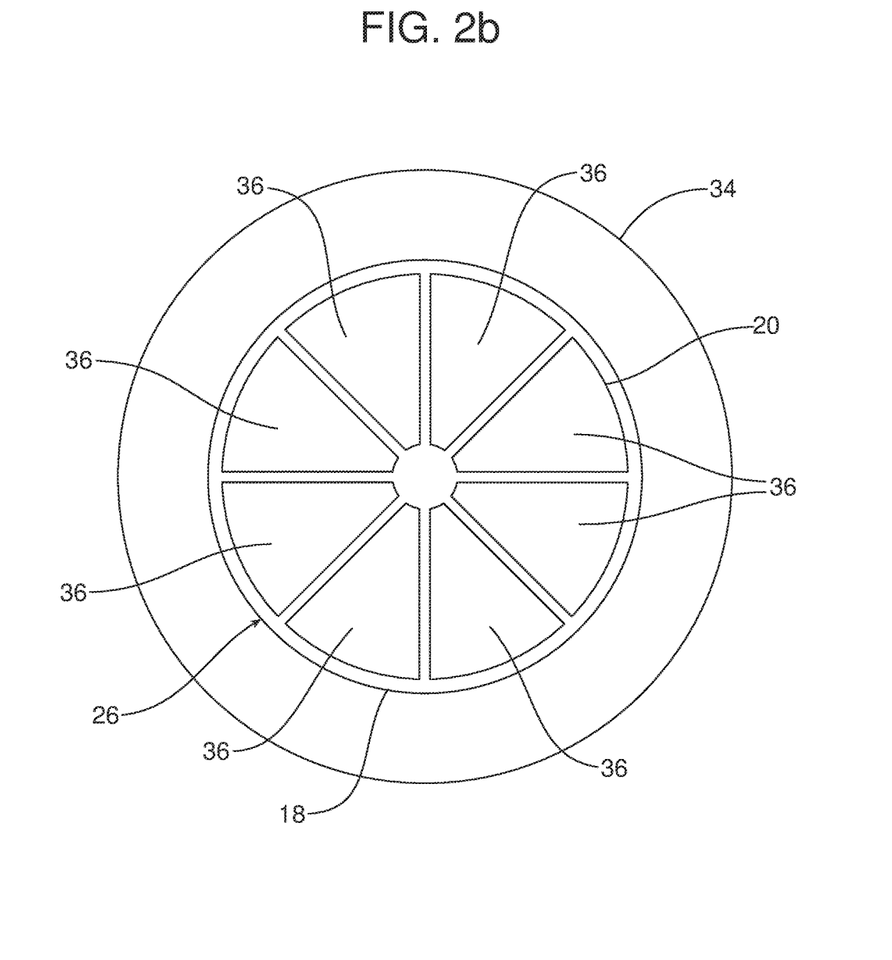
FIG. 2b is a schematic illustration of a second wheel rim of the motor vehicle.

FIG. 2b illustrates the second wheel rim 18 in detail. A tire 34 is held on the second wheel rim 18. As also illustrated, the second turbine blade feature 26 includes a second plurality of variable pitch turbine blades 36 that are illustrated in a closed position closing off the air outlet 20 within the second wheel rim 18. As should be appreciated from the following description, the first plurality of variable pitch turbine blades 32 of the first turbine blade feature 22 and the second plurality of variable pitch turbine blades 36 of the second turbine blade feature 26 may be opened or closed to control the flow of air, respectively, through the air inlet 14 and the air outlet 20.

Figure 3:
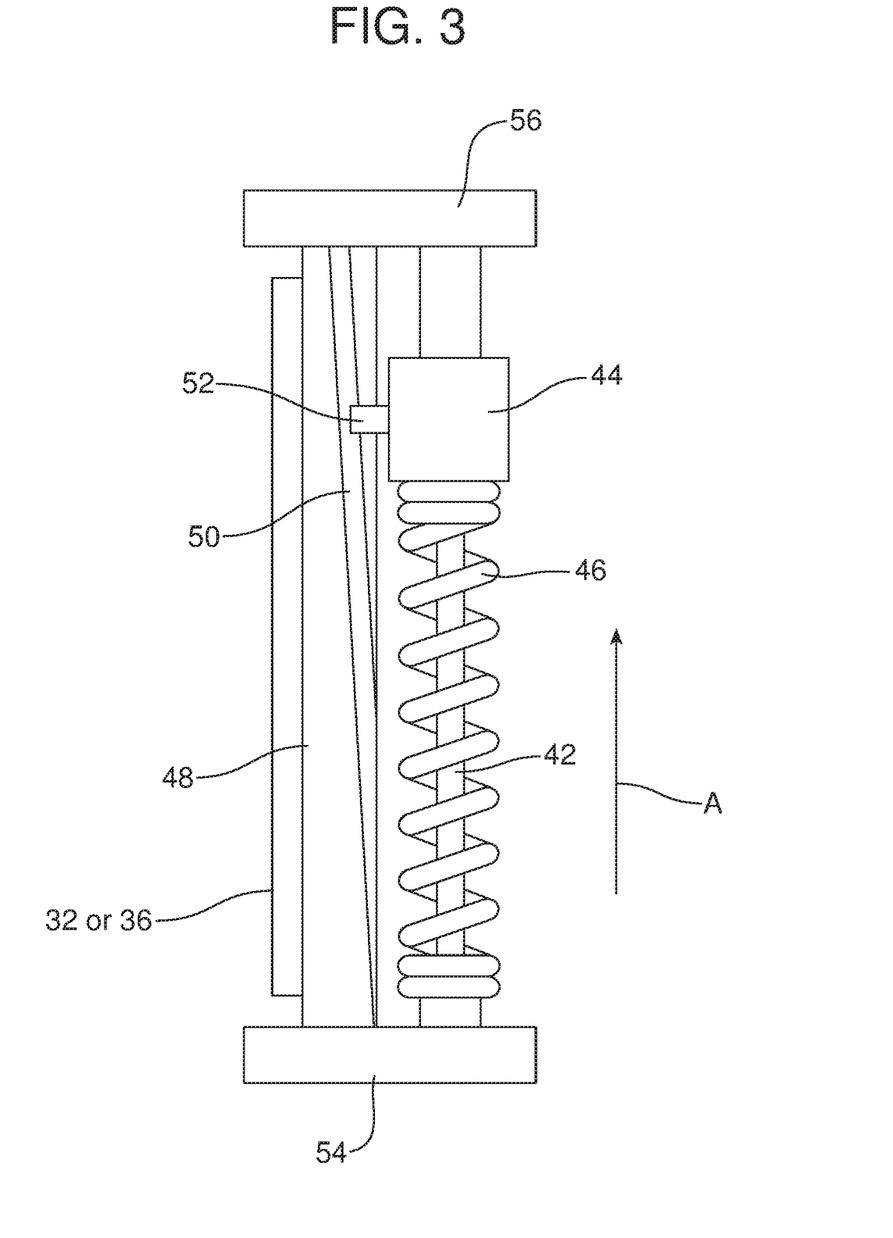
FIG. 3 is a schematic illustration of a variable pitch turbine blade utilized in some embodiments of the heat management system wherein the turbine blade is illustrated in the closed position.
Figure 4:
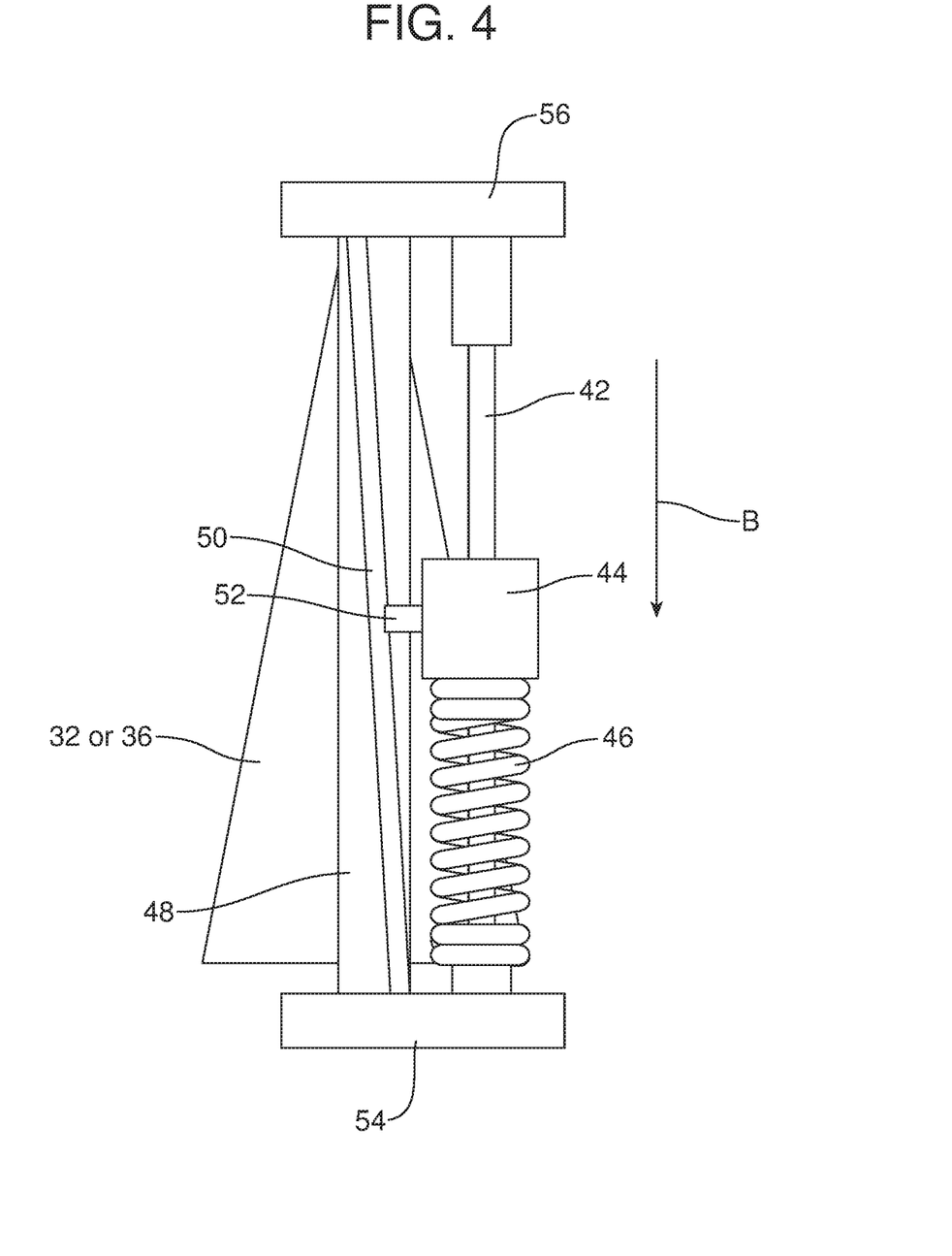
FIG. 4 is a view similar to FIG. 3 but showing the turbine blade in a more opened position.

More specifically, as illustrated in FIGS. 3 and 4, each turbine blade 32, 36 of the first plurality of turbine blades 32 and second plurality of turbine blades 36 includes a slide shaft 42, a mass block 44 displaceable along that slide shaft and a centripetal force opposition spring 46 concentrically received around the slide shaft 42.

Each turbine blade 32, 36 also includes an axis bar 48 having a spiral track or thread 50. The mass block 44 includes a thread key 52 that projects from the mass block 44 and rides in the spiral thread 50 thereby functioning to rotate each turbine blade 32, 26 depending upon the position of the thread key in the spiral thread as the mass block 44 is displaced along the slide shaft 42. Here it should be noted that the slide shaft 42 and the axis bar 48 both extend radially on the wheel rim 12 or 18 thereby extending between a radial outer end plate 54 and a radial inner end plate 56.

As illustrated in FIG. 3, when the wheel rim 12 or 18 is not rotating, the mass block 44 is biased by the spring 46 toward the radial inner end plate 56 on the slide shaft 42. Note action arrow A. As a result of the link provided between the thread key 52 on the mass block 44 and the spiral thread 50 on the axis bar 48, the turbine blade 32, 36 is biased into the closed position as illustrated in FIGS. 2a, 2b and 3 when the first and second wheel rims 12, 18 are not rotating.

In contrast as the rotational velocity of the wheel rims 12, 18 increases, the centripetal force applied to the mass block 44 also increases. This centripetal force acts in a direction opposite to the biasing of the spring 46 thereby causing the mass block 44 to move (note action arrow B) toward the radial outer end plate 54 on the slide shaft 42. This simultaneously causes the thread key 52 to ride down the spiral thread 50 on the axis bar 48 thereby rotating the turbine blade 32 or 36 to an open position. The higher the speed of rotation, the higher the centripetal force and the more open the turbine blade 32, 36. Thus, it should be appreciated that the first turbine blade feature 22 increases the amount of air being pushed through the air inlet 14 in proportion to the speed of the motor vehicle. Similarly, the second turbine blade feature 26 increases the amount of air being pulled through the air outlet 20 in proportion to the speed of the motor vehicle. Accordingly, it should be appreciated that the heat management system 10 provides air movement in proportion to cooling need. Stated another way, at higher motor vehicle speeds, the need for thermal load cooling generally increases and the heat management system 10 described herein provides higher air speed and volume to meet that need. At lower speeds, thermal load cooling requirements are typically lower and the heat management system 10 provides a lower volume of air at lower air speed in this circumstance.

Figure 5:
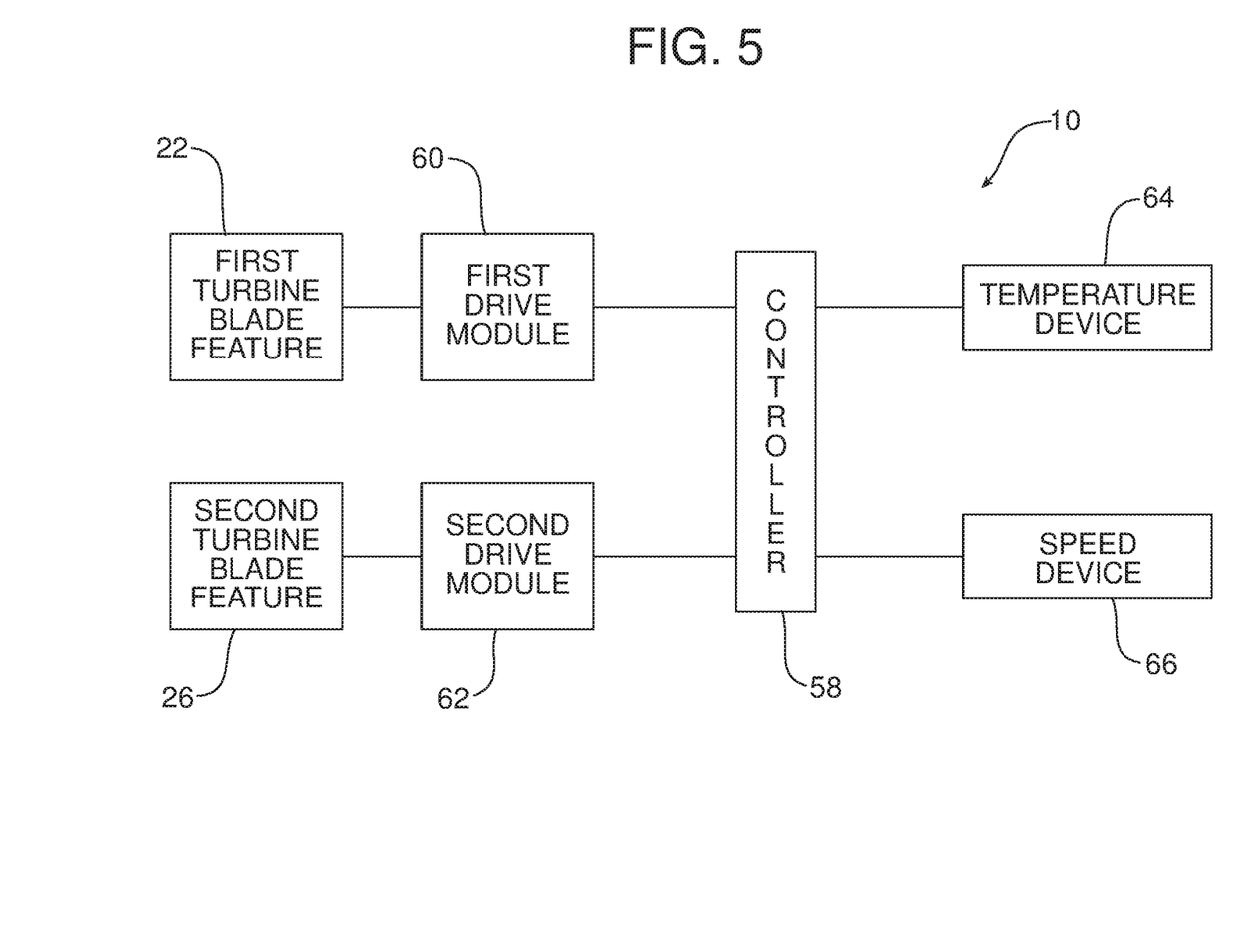
FIG. 5 is a schematic block diagram of yet another possible embodiment of the heat management system incorporating a controller providing for smart control of the pitch of the turbine blades of the heat management system Reference will now be made in detail to the present preferred embodiments of the heat management system, examples of which are illustrated in the accompanying drawing figures.

Reference is now made to FIG. 5 illustrating an alternative embodiment of heat management system 10 incorporating a controller 58 providing for smart operation of the heat management system. Controller 58 comprises a computing device such as a dedicated microprocessor or electronic control unit (ECU) operated in accordance with instructions from appropriate control software. Thus, the controller 58 may comprise one or more processors, one or more memories and one or more network interfaces all in communication with each other over a communication bus.

As illustrated, controller 58 is connected to a first drive module 60 for opening and closing the turbine blades of the first turbine blade feature 22 controlling air flow through the air inlet 14. As further illustrated, the controller 58 is also connected to a second drive module 62 for controlling the opening and closing of the turbine blades of the second turbine blade feature 26 for the opening and closing of the air outlet 20.

As further illustrated in FIG. 5, the controller 58 may also be connected to a temperature device 64, such as a sensor, for monitoring the temperature of the thermal load 16 and a speed device 66 for monitoring the speed of the motor vehicle. Both the temperature device 64 and the speed device 66 provide data to the controller 58 indicating the changing cooling requirements of the thermal load 16 and the controller 58 operates in response thereto to open and close the turbine blades 32 or 36 of the first turbine blade feature 22 and second turbine feature 26 through operation of the first and second drive modules 60, 62. In this way, the controller controls the air flow through the air inlet 14 and air outlet 20 to provide the desired cooling air to meet the cooling requirements of the thermal load 16.

Consistent with the above description, a method is provided of managing heat in a motor vehicle. That method may be broadly described as including the steps of: (a) directing air through an air inlet 14 in a first wheel rim 12, (b) passing that air through or in heat exchange relationship with a thermal load 16 downstream from the air inlet and (c) directing that air through an air outlet 20 in a second wheel rim 18 downstream from the thermal load.

More specifically, the method may include the step of drawing that air through the air inlet 14 by use of a first turbine blade feature 22 on the first wheel rim 12. Further, the method may include the step of expelling that air through the air outlet 20 by use of a second turbine blade feature 26 on the second wheel rim 18.

As also previously indicated, the method may include the step of varying the pitch of the turbine blades 32 of the first turbine blade feature 22 to control the flow of the air through the air inlet 14. Similarly, the method may include the step of varying the pitch of the turbine blades 36 of the second turbine blade feature 26 to control the flow of air through the air outlet 20.

As best illustrated in the FIG. 5 embodiment, the method may also include the step of varying the pitch of the first turbine blade feature 22 by a controller 58 configured to increase the flow of the air through the air inlet 14 in response to increased cooling requirements. In addition, the method may include the step of varying the pitch of the first turbine blade feature 22 by means of the controller 58 configured to decrease the flow of air through the air inlet 14 in response to decreased cooling requirements.

Still further, the method may include the step of varying the pitch of the second turbine blade feature 26 by means of the controller 58, where that controller is configured to increase the flow of the air through the air outlet 20 in response to increased cooling requirements. Similarly, the method may include the step of varying the pitch of the second turbine blade feature 26 by means of the controller 58, where that controller is configured to decrease the flow of air through the air outlet 20 in response to decreasing cooling requirements.

In summary, a number of benefits and advantages are provided by the heat management system 10 and the related method of managing heat in a motor vehicle as described in this documents. Since the air inlet 14 is located in the first wheel rim 12 on the side of the motor vehicle, it will not have the same negative impact in vehicle aerodynamics as a grill and radiator positioned at the front of the motor vehicle. Advantageously, the air inlet 14 on the first wheel rim 12 and the air outlet 20 on the second wheel rim 18 provide for increased air flow at higher vehicle speeds when overall vehicle cooling demand is also higher. The design of the heat management 10 may be further enhanced by having a first turbine blade feature 22 and a second turbine blade feature 26 both incorporating variable pitch turbine blades 32, 36. The pitch of these turbine blades 32, 36 may either be controlled through a centripetal mechanism as illustrated in FIGS. 3 and 4 that opens and closes the turbine blades 32, 36 in response to rim rotational velocity or by the use of an electronic control system incorporating a controller 58 for enhanced control as illustrated in FIG. 5.

Benefits from this approach may include downsizing or even complete elimination of the conventional thermal systems in the vehicle including, for example, radiator systems. This could offer improved aerodynamics and in turn improved fuel efficiency. Additionally, this technology may be eligible for providing carbon credits to vehicle fleets as is the case for other efficiency support technology such as LED lighting or on-car solar panels.

The foregoing has been presented for purposes of illustration and description. It is not intended to be exhaustive or to limit the embodiments to the precise form disclosed. Obvious modifications and variations are possible in light of the above teachings. For example, in the illustrated embodiment, the heat management system 10 includes a single rim 12 with an air inlet 14 and a single rim 18 with an air outlet 20. It should be appreciated that a motor vehicle may include two rims 12 with air inlets 14 and two rims 18 with air outlets 20 to direct air for cooling of the thermal load 16. All such modifications and variations are within the scope of the appended claims when interpreted in accordance with the breadth to which they are fairly, legally and equitably entitled.

What is claimed:

1. A heat management system for a motor vehicle, comprising:
  a first wheel rim including an air inlet;
  a thermal load downstream from said air inlet; and
  a second wheel rim including an air outlet downstream from said thermal load.

2. The heat management system of claim 1, further including a first turbine blade feature at said air inlet to force air toward said thermal load.

3. The heat management system of claim 2, further including a second turbine blade feature at said air outlet to draw said air from said thermal load.

4. The heat management system of claim 3, further including a first conduit directing said air from said air inlet to said thermal load.

5. The heat management system of claim 4, further including a second conduit directing said air from said thermal load to said air outlet.

6. The heat management system of claim 5, wherein said first turbine blade feature includes a first plurality of variable pitch turbine blades.

7. The heat management system of claim 6, wherein said second turbine blade feature includes a second plurality of variable pitch turbine blades.

8. The heat management system of claim 7, wherein each turbine blade of said first plurality of variable pitch turbine blades and said second plurality of variable pitch turbine blades includes a slide shaft, a mass block displaceable along said slide shaft and a centripetal force opposition spring.

9. The heat management system of claim 8, wherein said each turbine blade includes an axis bar having a spiral thread.

10. The heat management system of claim 9, wherein said mass block includes a thread key that rides in said spiral thread and rotates said each turbine blade depending upon a position of said thread key in said spiral thread.

11. The heat management system of claim 10, wherein said slide shaft and said axis bar extend radially on said first wheel rim or said second wheel rim.

12. A method of managing heat in a motor vehicle, comprising:
   directing air through an air inlet in a first wheel rim;
   passing said air in heat exchange relationship with a thermal load downstream from said air inlet; and
   directing said air through an air outlet in a second wheel rim downstream from said thermal load.

13. The method of claim 12, including drawing said air through said air inlet by use of a first turbine blade feature on said first wheel rim.

14. The method of claim 13, including expelling said air through said air outlet by use of a second turbine blade feature on said second wheel rim.

15. The method of claim 14, including varying pitch of said first turbine blade feature to control flow of said air through said air inlet.

16. The method of claim 15, including varying pitch of said second turbine blade feature to control flow of said air through said air outlet.

17. The method of claim 14, including varying pitch of said first turbine blade feature by a controller configured to increase flow of said air through said air inlet in response to increased cooling requirements.

18. The method of claim 17, including varying pitch of said first turbine blade feature by said controller configured to decrease flow of said air through said air inlet in response to decreased cooling requirements.

19. The method of claim 18, including varying pitch of said second turbine blade feature by said controller configured to increase flow of said air through said air outlet in response to increased cooling requirements.

20. The method of claim 19, including varying pitch of said second turbine blade feature by said controller configured to decrease flow of said air through said air outlet in response to decreased cooling requirements.

* * * * *